June 10, 1930. H. McLIND 1,762,874
AEROPLANE
Filed July 1, 1929 3 Sheets-Sheet 2
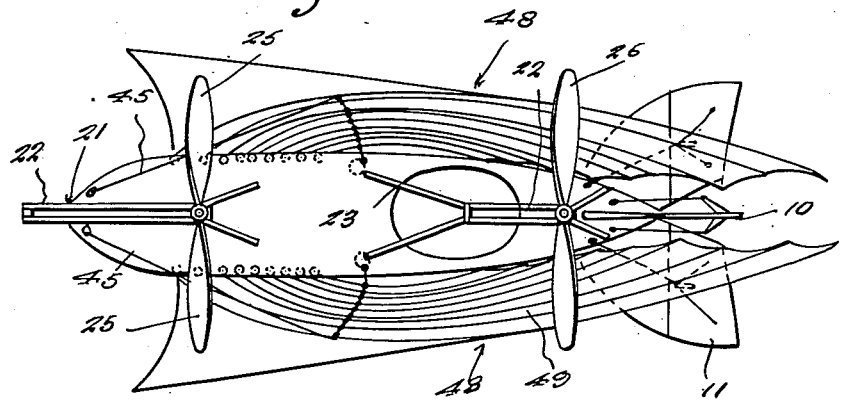
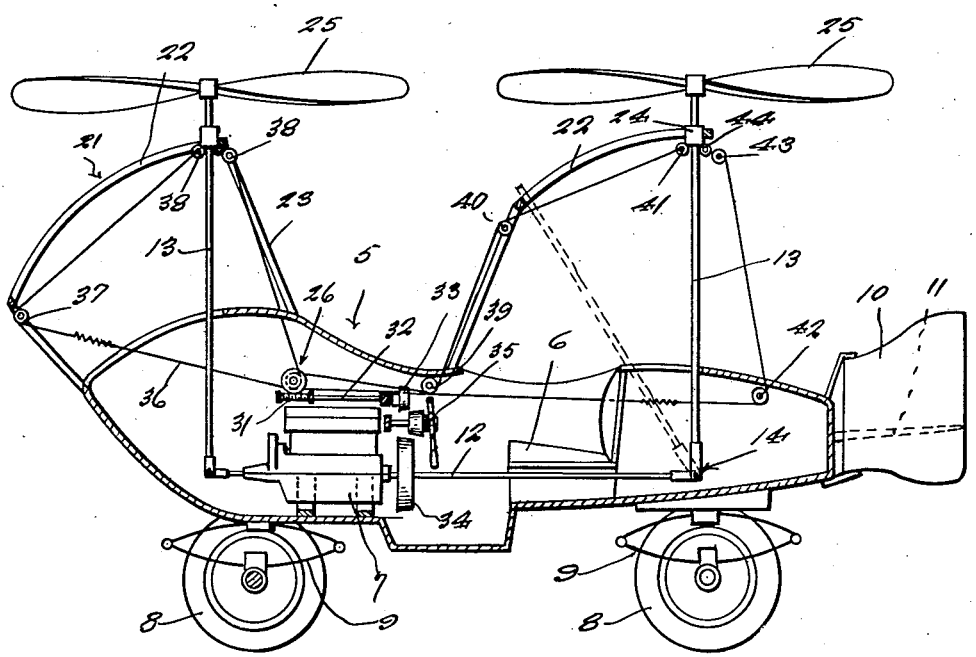
Inventor
Herman McLind
By Clarence A. O'Brien
Attorney

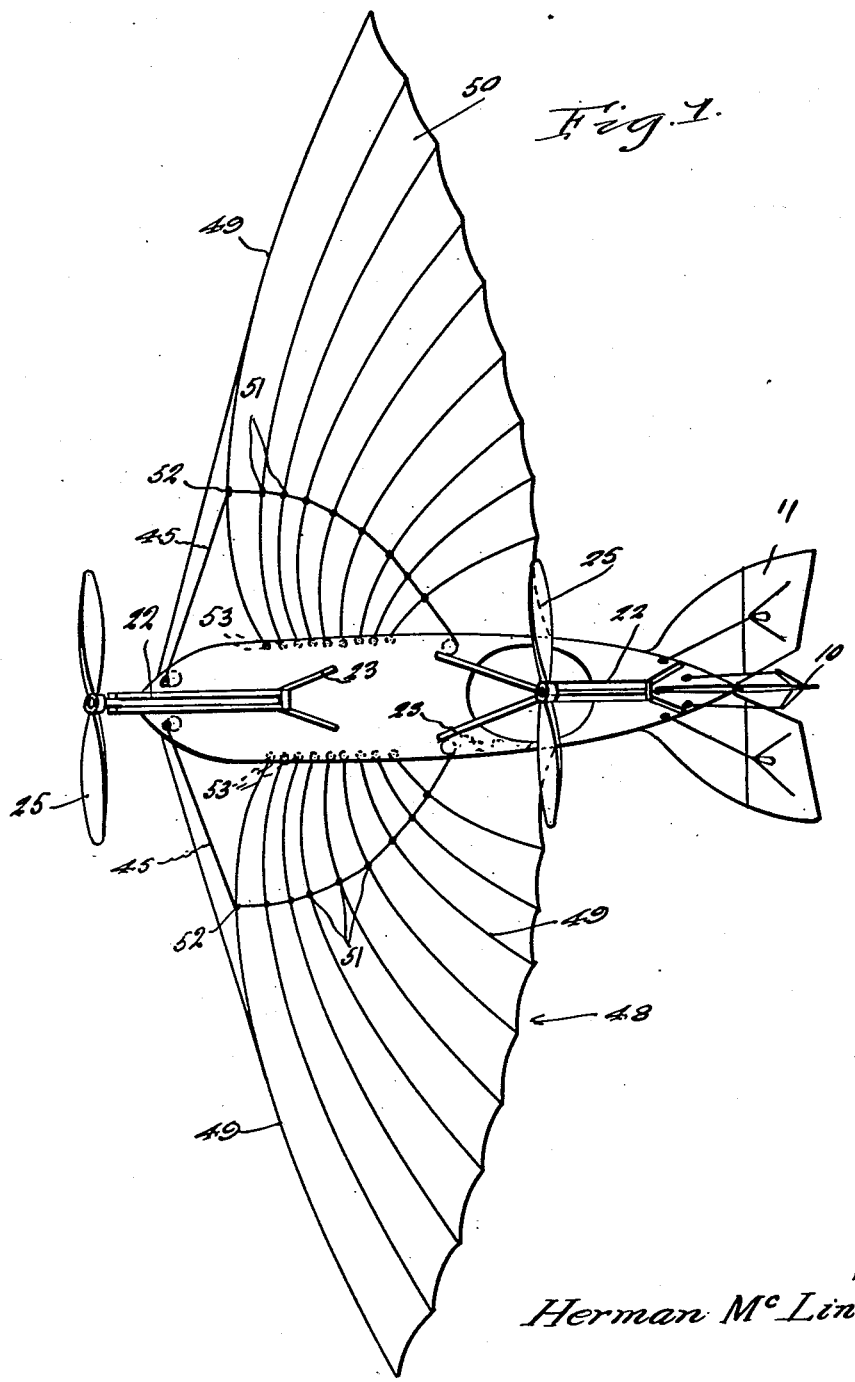

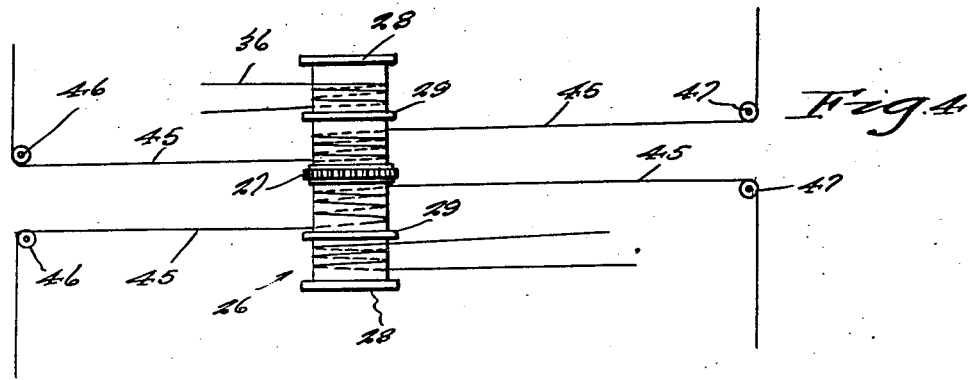
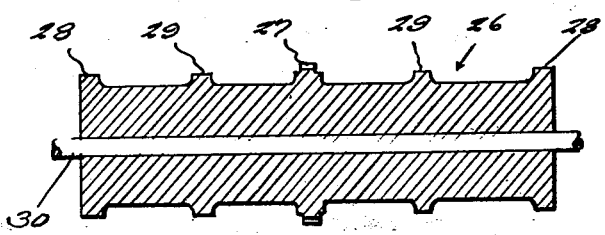
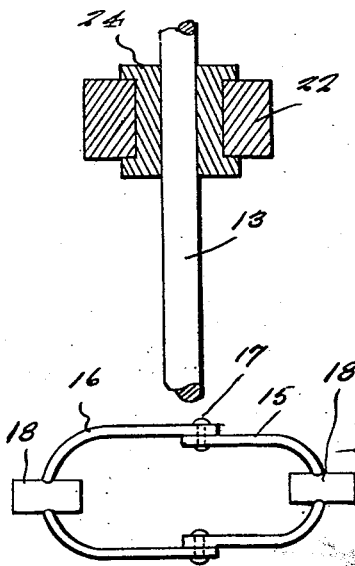
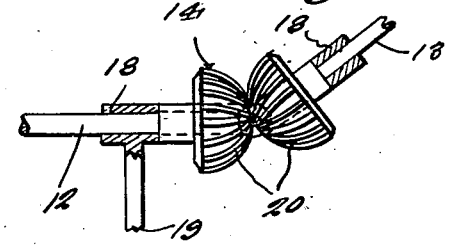

Patented June 10, 1930

1,762,874

UNITED STATES PATENT OFFICE

HERMAN McLIND, OF LOS ANGELES, CALIFORNIA

AEROPLANE

Application filed July 1, 1929. Serial No. 375,123.

The present invention appertains to new and useful improvements in aeronautics, and more particularly to a novel aircraft of the convertible helicopter type. It is the aim of this invention to provide an aircraft having wings and propellers for straight forward flight which may be adjusted for converting the aircraft into a helicopter type whereby the craft may rise vertically from the ground.

The principal object of this invention is to provide a convertible aircraft of the character mentioned which will be far more practical and efficient in operation than structures of this character heretofore attempted.

Another important object of the invention is to prepare an aircraft of the convertible type mentioned wherein the details are of simple design to permit the aircraft to be manufactured of light construction.

These and numerous other objects of the invention will become more apparent to the reader after considering the invention as described and claimed hereinafter.

In the drawings,

Figure 1 represents a top plan view of the novel aircraft with the wings thereof in extended position.

Figure 2 represents a top plan view of the novel aircraft with the wings thereof in contracted position.

Figure 3 represents a longitudinal vertical sectional view through the aircraft showing the propeller in vertical position.

Figure 4 represents a diagrammatic view of the drum and cable for controlling the propellers and wings.

Figure 5 represents a longitudinal sectional view through the drum structure.

Figure 6 represents a fragmentary vertical sectional view through the guide and propeller shafts.

Figure 7 represents a fragmentary side elevation in partial section disclosing the universal connection between the propeller shaft and the drive shaft of the motor.

Figure 8 represents a top plan view of the frame for connecting the engaging elements of the universal joint.

Referring to the drawings, wherein like numerals designate like parts, it will be seen that the present invention includes a fuselage or body portion generally referred to by 5. A seat 6 is provided at the intermediacy of the body and forwardly thereof is located the internal combustion engine 7. Wheels 8 are connected to the bottom of the body by leaf springs 9.

The rear portion of the body is equipped with a rudder 10 and elevator 11, while the engine 7 is provided with a forwardly as well as rearwardly extending drive shaft 12. Each end of the drive shaft 12 is connected to a propeller shaft 13 by a universal joint such as is generally referred to by numeral 14. This universal joint is clearly shown in Figures 7 and 8 and includes a frame such as is shown in Figure 8, consisting of a U-shaped member 15 pivotally connected at its free end to the inner side of the free ends of a relatively larger U-member 16, the pivot pins being denoted by numeral 17.

A collar 18 is provided at the bight portion of each U-member, the collar 18 of the U-member 16 being adapted to receive one end of the shaft 12, while the collar 18 of the U-member 15 is adapted to receive the propeller shaft 13. The collar 18 on the U-member 16 is adapted to be supported by suitable posts 19. As is clearly shown in Figure 7, the adjacent ends of the shafts 12 and 13 are equipped with constantly meshing hemispherical discs 20. Thus rotary motion may be transmitted from the drive shaft 12 to the propeller shaft 13.

Numeral 21 generally refers to the guide means for the propeller shafts, one of which is provided at the front and rear of the aircraft body, in the manner shown in Figure 3. The guide means each consists of a longitudinally slotted bar 22 supported at its ends by brace members 23, in the manner clearly shown, so that the propeller shaft may be moved forwardly in the manner shown in dotted lines in Figure 3. The shaft 13 extends through a flanged bushing 24 (Fig. 6) and is equipped at its upper end with a propeller 25.

A drum generally referred to by numeral 26 is clearly shown in Figures 4 and 5 and supported by a ring gear 27 at its intermediacy, each end of the drum being provided with a circumferentially extending flange 28, while an additional circumferential flange 29 is provided between each end flange 28 and the ring gear 27. A shaft 30 supports the drum 26. As is clearly shown in Figure 3, a worm gear 31 operable by the shaft 32, meshes with the ring gear 27 for rotating the drum 26. A gear 33 on the shaft 32 is meshable with the gear 34 on the drive shaft 12 by a clutch movable gear 35.

On each end portion of the drum 26 is a cable 36. The cable at one end of the drum has one end portion disposed over a pulley 37 on the front support 23 of the guide means 21 and attached to an eye member 38 on the collar 24 of the guide means, while the opposite end of the cable is attached directly to an eye 39 on the opposite side of the bushing 24. The cable at the opposite end of the drum has one end portion disposed under a pulley 39' and over a pulley 40 on the forward support of the slotted bar 22, of the rear guide means. The cable is then attached to an eye member 41. The opposite end of the cable is disposed under a pulley 42 and around a pulley 43 for connection to an eye 44 on the bushing 24 of the rear propeller shaft.

A pair of elongated cables 45 have their intermediacies convoluted about the drum 26 in the manner shown in Figure 4. One end portion of each cable is disposed around a corresponding drum 46 located at the forward end portion of the body 5. The other end portion of the cable is disposed rearwardly and around a pulley 47. These cables are operable to control the wing structures at the opposite sides of the body 5, each wing structure being generally referred to by numeral 48.

Each wing construction consists of a plurality of ribs 49, each slightly reduced in length in respect to its forward rib, these ribs being denoted by numeral 49. The ribs are covered by canvas 50 and adjacent the inner end of each rib an eye member 51 is provided for receiving the receiving end portion of one of the cables 45, which extends to the forwardmost rib 49 for connection to the eye 52, the same eye that the forwardly extending end portion of the same cable 45 connects. The inner ends of the ribs are pivotally connected to the aircraft body as at 53.

It will thus be seen that when the propeller shafts are lowered, the wing 48 will expand due to the movements of the cables 45. The cables 45 are actuated by the rotation of the drum 26 motivated by the cables 36 connected to the propeller shaft. Thus when the plane is to drive forwardly, the wings must be extended for sustaining flight, while the propeller shaft must be disposed vertically when the aircraft is to be employed as a helicopter for lifting the craft vertically.

While the foregoing description has been in specific terms, it is to be understood that numerous changes in the specific shape, size, and materials may be resorted to without departing from the spirit and scope of the invention as claimed hereinafter.

Having thus described my invention, what I claim as new is:

1. An aircraft of the character described comprising a body, a motor mounted in the body, said motor being provided with a drive shaft, a propeller shaft, means for pivotally connecting the propeller shaft to the drive shaft, collapsible wings on the body, means for adjusting the propeller shaft from a straight-forward propelling position to a vertical lifting position, and connections between the propeller shaft and the wings for adjusting the wings in accordance with the position of the propeller shaft.

2. An aircraft of the character described comprising a body, a motor mounted in the body, said motor being provided with a drive shaft, a propeller shaft, means for pivotally connecting the propeller shaft to the drive shaft, collapsible wings on the body, means for adjusting the propeller shaft from a straight-forward propelling position to a vertical lifting position, connections between the propeller shaft and the wings for adjusting the wings in accordance with the position of the propeller shaft, said pivotal connection between the propeller shaft and the drive shaft consisting of a hinged frame, opposed collars carried by the frame for rotatably receiving the drive shaft and the propeller shaft, and hemispherical discs at the adjacent ends of the shaft for connected relation.

In testimony whereof I affix my signature.

HERMAN McLIND.